(12) United States Patent
Poulakis

(10) Patent No.: US 8,910,350 B2
(45) Date of Patent: Dec. 16, 2014

(54) FASTENING SYSTEM

(75) Inventor: Konstantinos Poulakis, Hildrizhausen (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 0 days.

(21) Appl. No.: 13/261,557

(22) PCT Filed: Jun. 21, 2011

(86) PCT No.: PCT/EP2011/003046
§ 371 (c)(1),
(2), (4) Date: Feb. 6, 2013

(87) PCT Pub. No.: WO2012/007089
PCT Pub. Date: Jan. 19, 2012

(65) Prior Publication Data
US 2013/0125350 A1 May 23, 2013

(30) Foreign Application Priority Data

Jul. 16, 2010 (DE) .......................... 10 2010 027 394

(51) Int. Cl.
*F16B 5/07* (2006.01)
*B60R 13/02* (2006.01)

(52) U.S. Cl.
CPC ............... *F16B 5/07* (2013.01); *B60R 13/0243* (2013.01); *B60R 13/0206* (2013.01)
USPC ............................................. 24/306; 24/447

(58) Field of Classification Search
USPC .................... 24/306, 447, 448, 452
See application file for complete search history.

(56) References Cited

U.S. PATENT DOCUMENTS

| 4,322,875 | A | * | 4/1982 | Brown et al. .................... 24/447 |
| 5,058,245 | A |   | 10/1991 | Saito |
| 5,212,853 | A | * | 5/1993 | Kaneko ........................... 24/452 |
| 5,242,646 | A |   | 9/1993 | Torigoe et al. |
| 5,384,939 | A | * | 1/1995 | Weber ............................. 24/306 |
| 5,429,875 | A |   | 7/1995 | Okamoto et al. |
| 5,537,793 | A | * | 7/1996 | Murasaki ..................... 52/585.1 |
| 5,579,562 | A | * | 12/1996 | Hattori et al. ................... 24/452 |
| 5,611,122 | A | * | 3/1997 | Torigoe et al. ................. 24/442 |
| 5,614,232 | A | * | 3/1997 | Torigoe et al. ................ 425/545 |

(Continued)

FOREIGN PATENT DOCUMENTS

| DE | 86 24 663 U1 | 2/1987 |
| DE | 10 2008 007913 A1 | 8/2009 |
| WO | WO 2009/097 950 A1 | 8/2009 |

*Primary Examiner* — Robert J Sandy
*Assistant Examiner* — David Upchurch
(74) *Attorney, Agent, or Firm* — Roylance, Abrams, Berdo and Goodman LLP

(57) ABSTRACT

A fastening system for the releasable fixing of a second component (10) on a first component (12), such as the attachment of a covering component on a vehicle body component, has at least one spacer (20) fixed on one side of the first component (10) by a first fastener and provided on its opposite side with a first cling-fastener part (30). The first cling-fastener part can be brought into engagement releasably with a corresponding second cling-fastener part (32). The side of the second cling-fastener part facing away from the fastener elements (28, 34), can be fixed on the second component (12) by a second fastener (38). The spacer (20) can be fixed on the first component (10) by a screw connection forming the first fastener.

8 Claims, 4 Drawing Sheets

(56) References Cited

U.S. PATENT DOCUMENTS

| | | | |
|---|---|---|---|
| 5,662,853 A * | 9/1997 | Hattori et al. | 264/219 |
| 5,671,511 A * | 9/1997 | Hattori et al. | 24/444 |
| 5,691,021 A * | 11/1997 | Kobe | 428/40.1 |
| 5,725,423 A * | 3/1998 | Barry et al. | 451/539 |
| 5,842,240 A * | 12/1998 | Kato et al. | 4/633 |
| 6,076,238 A * | 6/2000 | Arsenault et al. | 24/452 |
| 2003/0010799 A1* | 1/2003 | Ashing et al. | 224/483 |
| 2006/0078370 A1* | 4/2006 | Autterson | 403/182 |
| 2008/0099639 A1* | 5/2008 | Webster | 248/188.9 |

\* cited by examiner

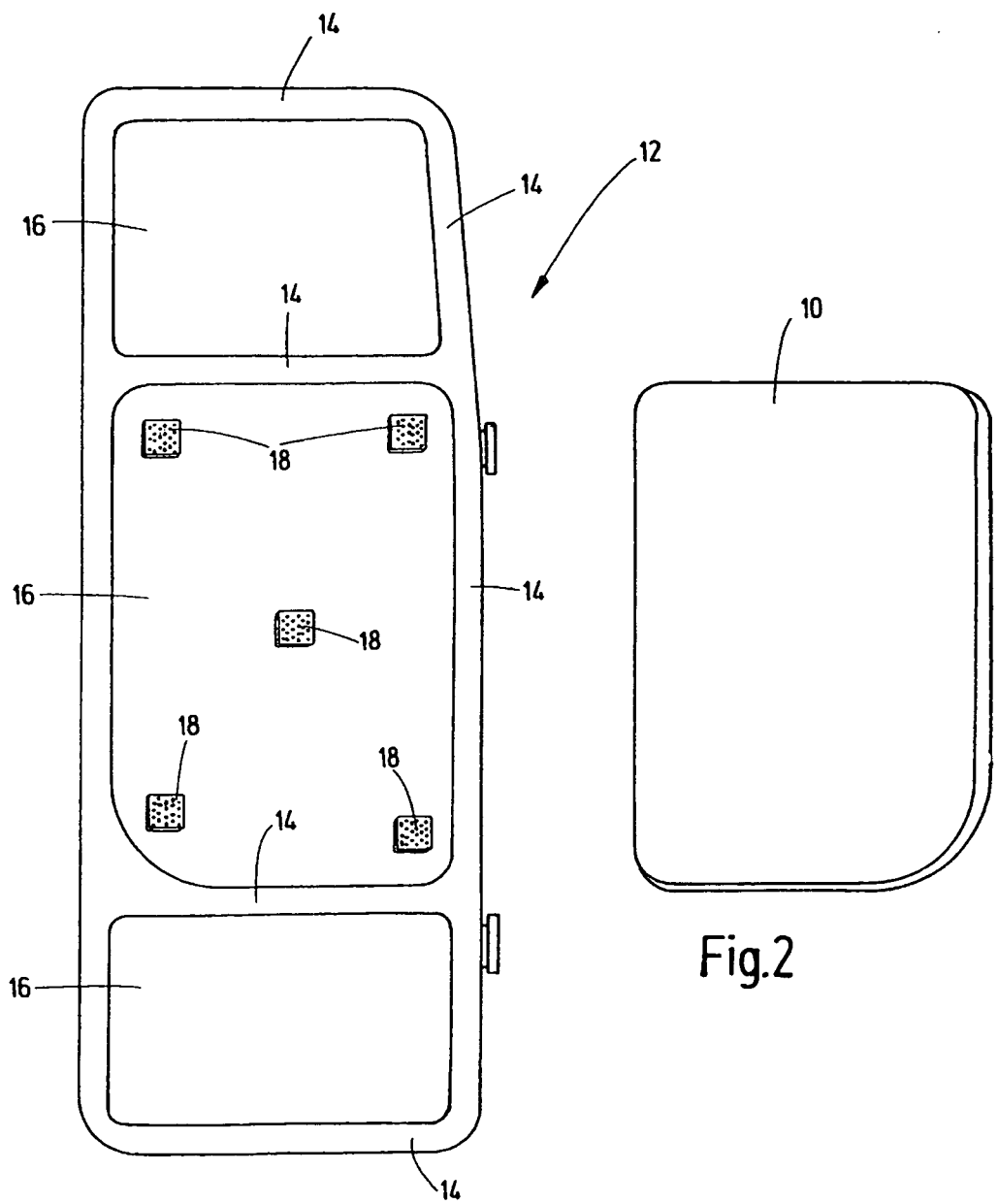

FASTENING SYSTEM

FIELD OF THE INVENTION

The invention relates to a fastening system for releasably fixing a second component on a first component, such as attaching a covering component to a component of a vehicle body. The fastening system has at least one spacer fixable on its one side on the first component by a first fastener and provided on its opposite side with a first touch-and-close fastener part. The first touch-and-close fastener part can be brought into releasable engagement with a corresponding second touch-and-close fastener part. The second touch-and-close fastener part, on its side facing away from the fastener elements, can be fixed on the second component by means of a second fastener.

BACKGROUND OF THE INVENTION

The fastening system disclosed in WO 2009/097950 is used, among other things, to fix two-dimensional coverings at defined locations, for example, to mask unsightly looking areas. It can also be used for thermal and acoustical insulation. Panel-shaped covering components are used, for example, in the production of motor vehicles to cover large areas of sheet metal parts as the components of the vehicle body. In this context, components of a vehicle body may include, for example, loading doors, floors and ceilings of the vehicle body. In addition to this motor vehicle sector, such fastening systems can be used in trains, ships, and aircraft, where comparable problems have to be solved.

Since fastening systems provide a releasable connection between a second component, such as a covering component, and a first component, such as another component, technical devices, extending inside the other component, such as cables, air conditioning ducts, control electronics, etc., can be designed to be easily accessible, as needed, by simply removing the covering part from the other component with the respective technical device. Due to the fastening by interactive touch-and-close fastener parts, such measures can be carried out with relatively little physical effort and minimal installation effort.

Certain limitations with respect to the use of such fastening system exist only in cases in which the covering components are subject to high thermal loads. For example, problems due to high thermal loads exist when the fastening system is installed for vehicle body components exposed, for example, to higher temperatures, for example, due to direct solar radiation in the summer. Therefore, it is mandatory to design the adhesive bond, which is provided in the state of the art, between the spacer and the component, such as the vehicle body component, such that this adhesive bond is suitably heat resistant. Preferably, reactive adhesives, such as moisture crosslinking polyurethane adhesives, are used for this purpose. High temperature resistant hot melt adhesives, such as polyamide adhesives can also be used. The handling of such relatively cost intensive adhesives is relatively time consuming.

SUMMARY OF THE INVENTION

An object of the present invention is to provide an improved fastening system that can be used advantageously for all purposes, even in cases of increased thermal stress.

The invention basically achieves this object by a fastening system where a spacer can be fixed on the first component by a screw connection forming the first fastener. While still retaining the advantages offered by a fastening system corresponding to the state of the art, the screw connection, provided according to the invention, enables reliable use even under service conditions during which, in particular, thermal stresses may occur, without high temperature resistant adhesives being necessary.

Consequently, the arrangement can be configured in an especially advantageous way in that the spacer has a drilled hole for forming the screw connection. This drilled hole has an opening edge facing the fastener elements and having a conical expansion in which the head of a countersunk head screw can be received. The upper end of the head is then located below the fastener elements. When the screw connection is designed to be "sunk" or countersunk, the mutual mating of the corresponding fastener elements is not adversely affected by the screw connection.

Advantageously the spacer can be a frame part having a rectangular box shape as well as a frame depression for the flush reception of a substrate layer with the fastener elements of the first touch-and-close fastener part. The drilled hole is formed preferably in the central region of the frame depression.

In this context, the arrangement can be configured with a distinct advantage in that the opening edge of the drilled hole is surrounded by an annular rib. The annular rib projects from the surface of the frame depression and is concentric to the drilled hole. The height of the annular rib is equal to or less than the thickness of a substrate layer of the fastener elements. The substrate layer is receivable in the frame depression. This projecting annular rib can extend, relative to the centering of the substrate layer, into a round opening formed in the substrate layer.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are diagrammatic and not to scale:

FIG. 1 is a side elevational view of a loading door of a transport bus;

FIG. 2 is a side elevational view of a covering component to be fixed on the loading door of FIG. 1 by the fastening system;

DETAILED DESCRIPTION OF THE INVENTION

Figure 3:
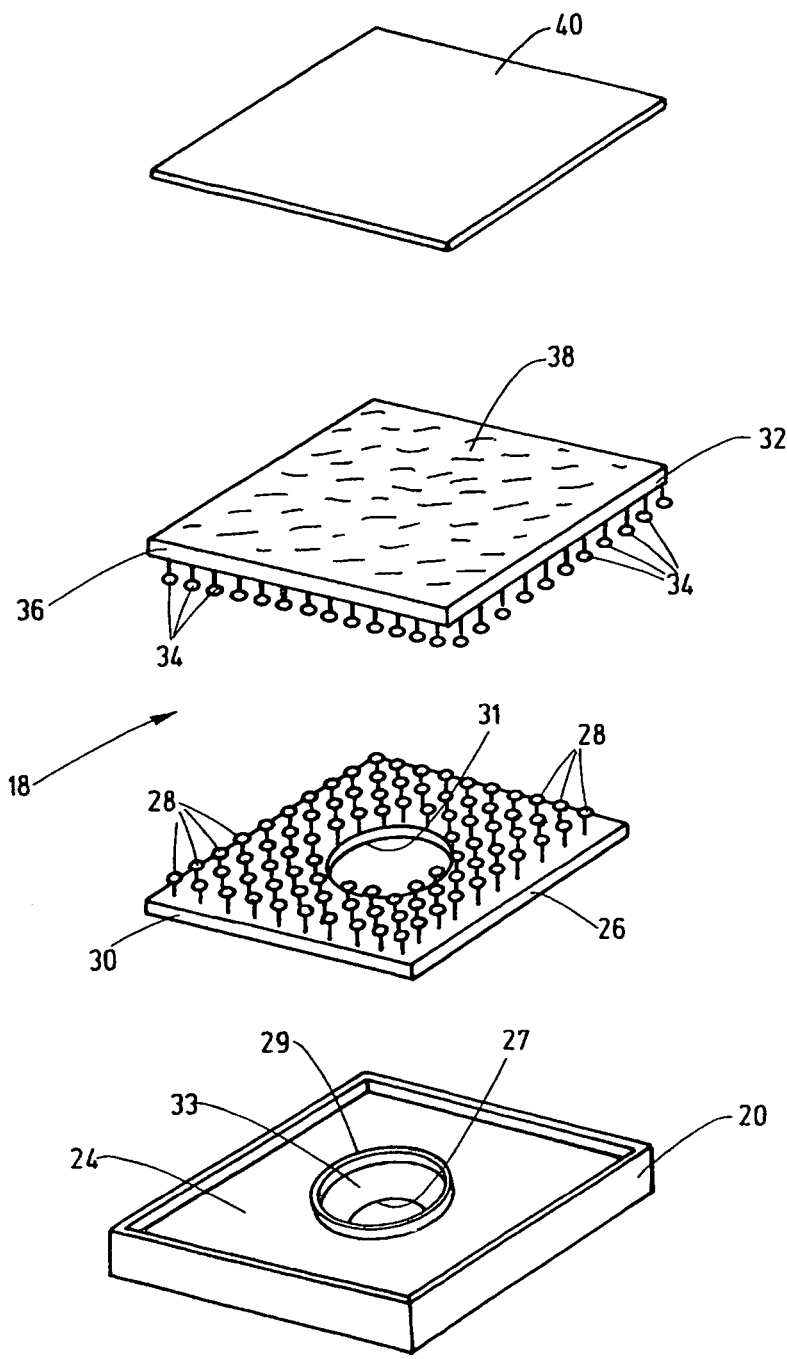
FIG. 3 is an exploded perspective view of a fastening system according to an exemplary embodiment of the invention.

The fastening system is explained in detail by one exemplary embodiment shown in FIGS. 1 and 2. The fastening system serves to releasably attach a second component 10, in this case a covering component, for example, a multi-layered wood panel, to a first component 12, in this case a component of a vehicle body, for example, in the form of the loading door (shown in FIG. 1) of a transport bus. This door is made chiefly of sheet metal components. The individual sheet metal profiles 14 of the door are separated from each other by recessed surfaces 16. The middle surface 16 serves to receive the covering component 10 (shown in FIG. 2). This covering component is folded around an imaginary longitudinal axis and is placed on the vehicle body component 12 such that the fastening parts 18 shown in FIG. 1 are no longer visible and face the rearward, continuous surface of the covering component 10.

Instead of the five fastening parts 18, shown in FIG. 1, more or fewer fastening parts 18 can be used as a function of the configuration of the covering component 10. Covering components 10 are cut to size to be comparable to the surfaces 16 and can be inserted in a comparable manner into the top and bottom surfaces 16 of the sheet metal door not shown for the sake of simplicity.

FIG. 3 shows a fastening part 18 in its entirety. This fastening part is constructed a composite of individual components, beginning with a spacer 20. This spacer is formed preferably as an injection molded part and is made, for example, of a polyamide 6 material. The spacer 20 has a rectangular box shape with a frame depression 24 for the flush reception of a substrate layer 26 with the mushroom head-shaped fastener elements 28 of the first touch-and-close fastener part 30. Corresponding in size, a second touch-and-close fastener part 32 is arranged above said first touch-and-close fastener part and inside the composite. When viewed in the direction of FIG. 3, the underside of said second touch-and-close fastener part also bears mushroom head-shaped fastener elements 34 designed to correspond to the fastener elements 28. The mushroom heads 34 of the second touch-and-close fastener part 32 can mesh with the spaces formed by and between the mushroom heads 28 of the first touch-and-close fastener part 30 in a releasable manner to produce a touch-and-close fastener as a whole. The respective mushroom heads of the fastener elements 28, 34 are connected to the respective substrate layers 26, 36 by stalks or stems. The mushroom heads 34 for the second touch-and-close fastener part 32 can be replaced with fleece material (not shown in detail), which in the fixed state interlocks correspondingly with the mushrooms 28 of the first touch-and-close fastener part 30. Mushroom heads 28 can also be designed as a hook fastener. The fastener elements can be exchanged, for example, such that the fleece is arranged on the first touch-and-close fastener part 30 and the mushrooms are arranged on the second touch-and-close fastener part 32. Furthermore, male fastener elements, such as hooks, mushrooms, etc., can be arranged with female fastener elements, such as loops, on one side of a touch-and-close fastener part 30, 32.

The back side of the second touch-and-close fastener part 32 exhibits a second fastening means 38, preferably in the form of an adhesive. An adhesive that is used most preferably for this purpose is a pressure sensitive, acrylate-based adhesive or a so-called synthetic rubber adhesive. In order to protect the top adhesive layer 38, which can be seen in the direction of FIG. 3, there is a peelable protective film 40, preferably in the form of a polyethylene film.

The composite of spacer 20 with the two touch-and-close fastener parts 30, 32 forms together with the protective film 40 a fastening part 18 according to FIG. 1. This composite forming the fastening parts 18 is securely connected by a screw connection with the component 12 of the vehicle body in such a way that the underside of the spacer 20 rests, in the direction of FIG. 1, against the top side of the surface 16 of the vehicle body component 12 as the first component. If at this point the protective film 40 is removed from the respective composite, the covering component 10, which is folded, as the second component, by 180° in the longitudinal direction, can be fixed in a defined manner on the fastening parts 18 on the inside of the door. The detailed design of the screw connection for fixing the spacer 20 on the vehicle body component 12 is explained in detail below with reference to FIGS. 4 to 7.

If at this point the covering component 10 is to be detached from the vehicle body component 12, the covering component 10 is peeled off correspondingly from the surface 16 of the door, with the spacer 20 and the first touch-and-close fastener part 30 remaining on the vehicle body component 12 (door) as the first component. The corresponding second touch-and-close fastener part 32 remains on the covering component 10 as the second component. When the covering component 10 is removed, corresponding maintenance work can be performed on the door. The first touch-and-close fastener part 30 is fixed by an adhesive (not shown in detail) in the frame depression 24 of the spacer 20. Preferably, spacer 20 has the shape of a square cross section, such that the first touch-and-close fastener part cannot be lost.

Figure 4:
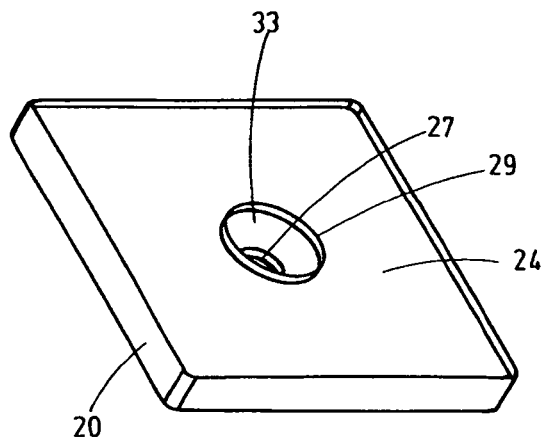
FIG. 4 is a perspective view of the spacer of FIG. 3, shown separately.
Figure 6:
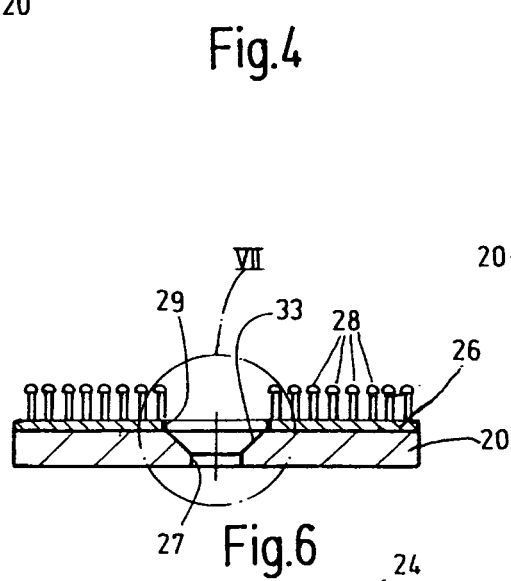
FIG. 6 is a side elevational view in section of the spacer with the touch-and-close fastener part mounted the frame depression of the spacer of FIG. 3.
Figure 7:
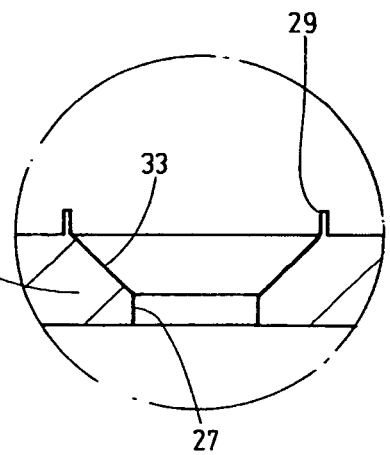
FIG. 7 is a side elevational view of an enlarged portion of the spacer in the region VII of FIG. 6.
Figure 5:
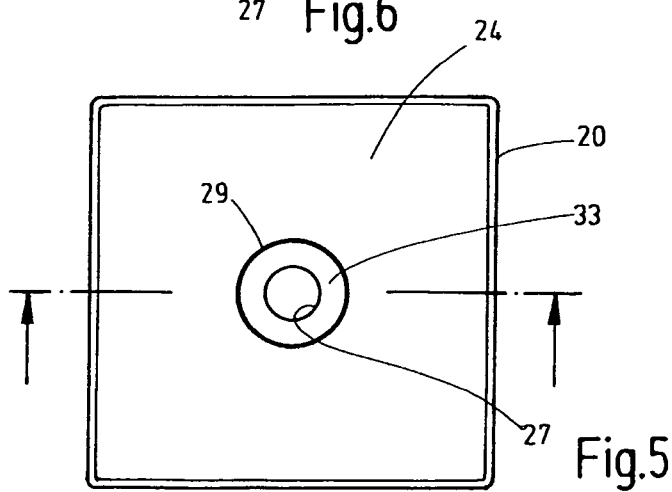
FIG. 5 is a top plan view of the spacer of FIG. 3 shown separately.

FIGS. 3 to 7 show forming the screw connection in the central region of the frame depression with the spacer 20 having a drilled hole 27. Hole 27 has an opening edge that faces the fastener elements 28. This opening edge forms a conical expansion or countersink 33 as the seat for the head of a countersunk head screw (not illustrated). The conical expansion 33 is designed to be adapted to the shape and dimensions of the head (not illustrated) of the countersunk head screw, so that the head may be found below the fastener elements 28, and preferably does not protrude beyond the substrate layer 26. As a result, the interlocking engagement is not impeded by the countersunk head screw. FIGS. 3, 4, and 7 show that the opening edge of the drilled hole 27 is enveloped by a concentric annular rib 29 at the end of the expansion 33. This annular rib 29 projects from the surface of the frame depression 24 by a distance that corresponds more or less to the thickness of the substrate layer 26 (see FIG. 6). When the substrate layer 26 rests on the surface of the frame depression 24, the annular rib 29 extends in a centering manner into an opening 31 constructed with a diameter slightly exceeding the outside diameter of the annular rib 29 and located in the substrate layer 26.

The height of the respective spacers 20 can be designed to vary to be able to compensate for dissimilar dimensions, for example, inside the vehicle body component 12. To be able to ensure ease of assembly on site, the various groups of spacers 20 can be colored such that one design, for example, with the greater height is colored blue. The other spacers 20 then are colored a different color, for example, green.

Figure 9:
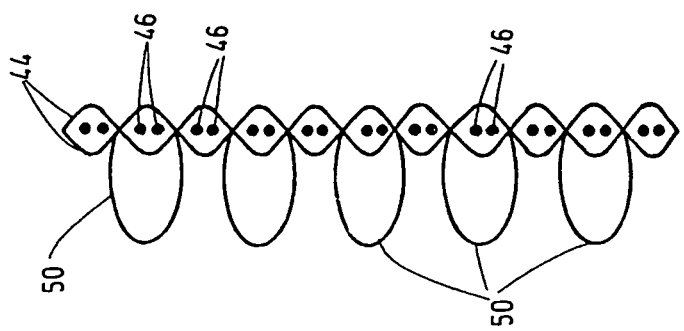
FIG. 9 is a side elevational view of the two-dimensional touch-and-close fastener part of FIG. 8.

The two touch-and-close fastener parts 30, 32 shown in FIG. 3 can be designed, for example, such that stem-shaped fixing parts are enclosed from the rear side into drilled holes provided for this purpose in a plate-shaped substrate structure, and hence, in the substrate layer 26. These drilled holes are formed in the manner of a fixing element that has the form of a clamp or a U-shape. To form the mushroom head-shaped fastener elements 28, 34, the free stem ends projecting out from the substrate layer 26 of the stem-like fixing elements are shaped by heat treatment and/or mechanical devices. In this way the characteristic head shape is attained. The individual stem elements can also be inserted from the respective free face side into corresponding recesses (drilled holes) in the respective substrate layer 26, 36 by a loading machine, known from computer technology, such that connections in turn can be carried out by applying a suitable adhesive. Thickenings in the form of mushroom heads on the free end of the respective stalk part can be achieved by a preferred heat treatment or mechanical shaping process. A preferred method for obtaining the corresponding touch-and-close fastener part 30 and/or 32 is depicted in the embodiment according to FIGS. 8 and 9.

Figure 8:
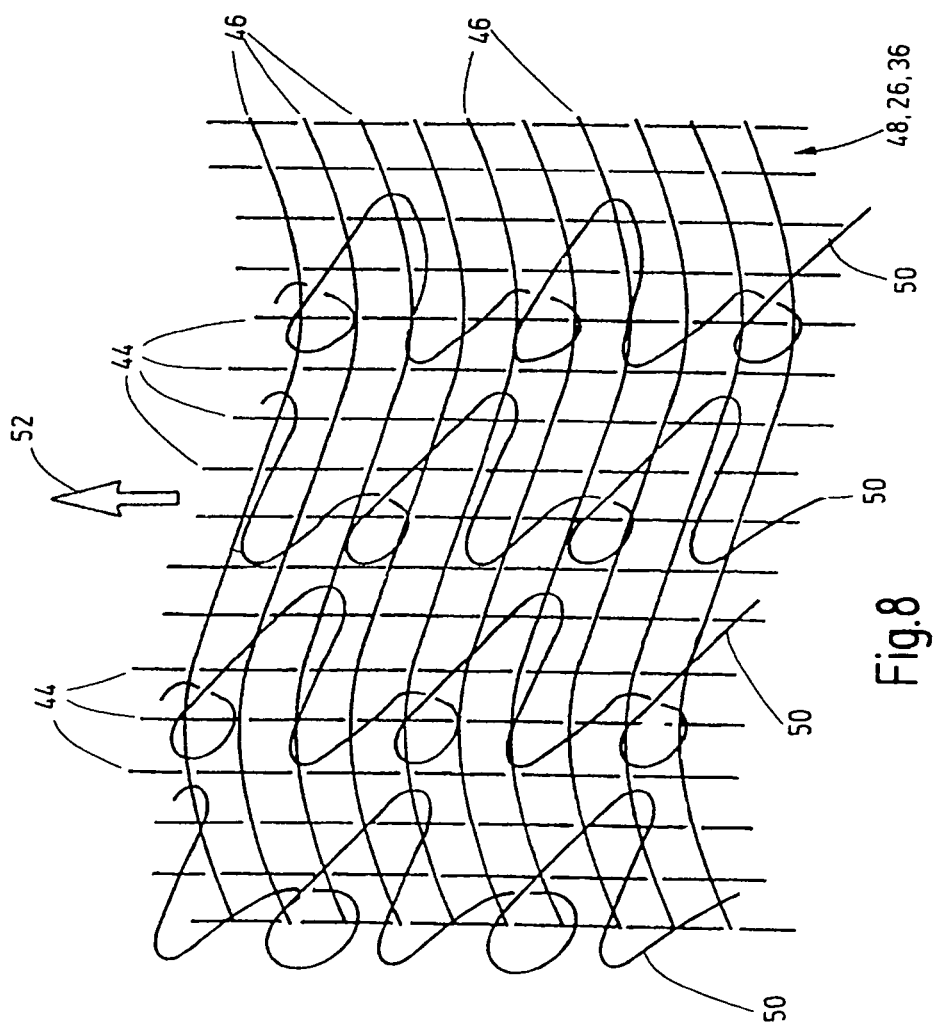
FIG. 8 is a top plan view of the weave pattern of a touch-and-close fastener part used for the fastening system of FIG. 3.

FIG. 8 is a top view of a portion of a two-dimensional touch-and-close fastener part 30 and/or 32. The touch-and-close fastener part 30, 32 can be lengthened, as desired, in the one and also in the other direction of the figure within the plane of the figure. The geometric dimensions of the flat shaped article are a function of the specification of the weaving machine, on which the touch-and-close fastener part 30, 32 is fabricated. In the present embodiment, the respective touch-and-close fastener part 30, 32 included warp threads 44 and weft threads 46. Those threads are woven together in a transverse arrangement to form the backing fabric 48 for the touch-and-close fastener part 30, 32. A backing fabric 48 forms, for this purpose, the respective substrate layer 26 and/or 36. Furthermore, the backing fabric 48 is constructed with functional threads 50 in the manner of pile threads. The respective functional threads 50 form the individual mushroom head-shaped fastener elements 28, 34 for the two-dimensional touch-and-close fastener part. To obtain the mushroom head-shaped fastener elements 28, 34, the pile threads 50 are separated at their upper arc, according to FIG. 9, and then a suitable heat treatment causes the free stalk ends to be shaped into the desired mushroom head-shaped fastener elements 28, 34. The results are then the fastener elements shown in FIG. 3.

Moreover, viewed in the direction of FIG. 8, the top side of this figure shows the production direction for the respective touch-and-close fastener part 30, 32 with an arrow 52. In the illustrated arrangement, according to FIG. 8, the respective weft threads 46 have an arc shape in the manner of a sine or cosine wave. At the crossing sites between the warp threads 44 and weft threads 46, the warp threads 44 extend parallel to the production direction 52 as well as parallel to one another in a linear arrangement. Instead of the sine or cosine wave, the weft threads 46 can be arranged in a linear manner to facilitate the production. Only with the wave or arc shape is the linear orientation, extending in one direction, avoided at the fastener elements 28, 34 of the touch-and-close fastener. An arc-shaped, sinusoidal arrangement provides a defined resistance against the disengagement movement of the corresponding fastener elements 28, 34, so that the holding forces are substantially constant and as such can also be calculated.

The individual fastener parts 30, 32 can be cut out of the two-dimensional composite that is produced in this way. Alternatively, the weaving method is configured such that the required square base shape is achieved immediately. Instead of the illustrated weaving method, the proposed fastener can also exist in the knitted form.

At variance with the examples in FIGS. 1 and 2, the fastening parts 18 could be securely attached with the spacers 20 on the covering component 10 as the first component by a screw connection. The touch-and-close fastener parts 32 would then be provided by the vehicle body component 12 as the second component.

While one embodiment has been chosen to illustrate the invention, it will be understood by those skilled in the art that various changes and modifications can be made therein without departing from the scope of the invention as defined in the appended claims.

What is claimed is:

1. A fastening system for releasably fixing a first component on a second component, comprising:
    at least one spacer in a form of a frame part, fixable on a first side thereof on the first component by a first fastener, said first fastener forming a screw connection, said frame part having a rectangular box shape and a frame depression;
    a first touch-and-close fastener part on an opposite second side of said spacer and having first fastener elements extending from a substrate layer, said substrate layer being received in said frame depression so as to be flush with said frame part;
    a second touch-and-close fastener part releasably matably engageable with said first touch-and-close fastener part, having a side facing away from said first fastener elements of said first touch-and-close fastener part fixable with the second component by a second fastener; and
    a drilled hole in a central region of said frame depression of said spacer forming said screw connection, said drilled hole having an opening edge facing said first fastener elements of said first touch-and-close fastener part and having a conical expansion for receiving a countersunk screw head with a head thereof located below said first fastener elements.

2. A fastening system according to claim 1 wherein
    an annular rib surrounds said opening edge of said drilled hole, projects from a surface of said frame depression and is concentric to said drilled hole, said annular rib having a height not greater than a height of said substrate layer.

3. A fastening system according to claim 2 wherein
    said first-touch-close fastener part comprises a round opening penetrating said substrate layer thereof and receiving said annular rib therein centering said opening with said opening edge of said drilled hole.

4. A fastening system according to claim 1 wherein
    said second touch-and-close fastener part comprises second fastener elements, said first and second fastener elements have first and second mushroom heads, respectively, said first mushroom heads releasably meshing with spaces formed by said second mushroom heads.

5. A fastening system for releasably fixing a first component on a second component, comprising:
    at least one spacer in a form of a frame part, fixable on a first side thereof on the first component by a first fastener, said first fastener forming a screw connection;
    a first touch-and-close fastener part on an opposite second side of said spacer and having first fastener elements extending from a substrate layer;
    a second touch-and-close fastener part releasably matably engageable with said first touch-and-close fastener part, having a side facing away from said first fastener elements of said first touch-and-close fastener part fixable with the second component by a second fastener; and
    a drilled hole in said spacer forming said screw connection, said drilled hole having an opening edge facing said first fastener elements of said first touch-and-close fastener part and having a conical expansion for receiving a countersunk screw head with a head thereof located below said first fastener elements; and
    an annular rib surrounding said opening edge of said drilled hole, projecting from a surface of said spacer and being concentric to said drilled hole, said annular rib having a height not greater than a height of said substrate layer.

6. A fastening system according to claim 5 wherein
said first-touch-close fastener part comprises a round opening penetrating said substrate layer thereof and receiving said annular rib therein centering said opening with said opening edge of said drilled hole.

7. A fastening system according to claim 5 wherein
said second touch-and-close fastener part comprises second fastener elements, said first and second fastener elements have first and second mushroom heads, respectively, said first mushroom heads releasably meshing with spaces formed by said second mushroom heads.

8. A fastening system according to claim 5 wherein
said substrate layer is received in a frame depression in said spacer; and
said annular rib projects from a surface of said frame depression.

* * * * *